(Model.)

4 Sheets—Sheet 1.

J. PRICE.
Baling Press.

No. 232,298. Patented Sept. 14, 1880.

Attest:
Warren Seely
R. F. Barnes.

Inventor:
Jacob Price,
by Ellis Spear
Attorney.

(Model.)

J. PRICE.
Baling Press.

No. 232,298.   Patented Sept. 14, 1880.

(Model.)

4 Sheets—Sheet 3.

J. PRICE.
Baling Press.

No. 232,298. Patented Sept. 14, 1880.

Attest:
R. F. Barnes.
Warren Seely

Inventor:
Jacob Price,
by Ellis Spear
Attorney (Model.)

J. PRICE.
Baling Press.

No. 232,298.

4 Sheets—Sheet 4.

Patented Sept. 14, 1880.

Attest:
R. F. Barnes
Warren Seely

Inventor:
Jacob Price
by Ellis Spear
Attorney

UNITED STATES PATENT OFFICE.

JACOB PRICE, OF SAN LEANDRO, CALIFORNIA, ASSIGNOR OF ONE-HALF OF HIS RIGHT TO FRANK A. HILL, OF SAME PLACE.

BALING-PRESS.

SPECIFICATION forming part of Letters Patent No. 232,298, dated September 14, 1880.

Application filed April 6, 1880. (Model.)

*To all whom it may concern:*

Be it known that I, JACOB PRICE, of San Leandro, in the county of Alameda and State of California, have invented a new and useful Improvement in Baling-Presses; and I do hereby declare that the following is a full, clear, and exact description of the same.

My invention relates to an improvement in machines for baling cotton, hay, &c., whereby such hay is pressed into a bale in layers by the action of a reciprocating follower operating against a solid fixed head.

My invention consists in certain improvements in the construction of the parts of a baling-press, and in the novel combination and arrangement of such parts, as will be specifically hereinafter described and claimed.

Figure 1:
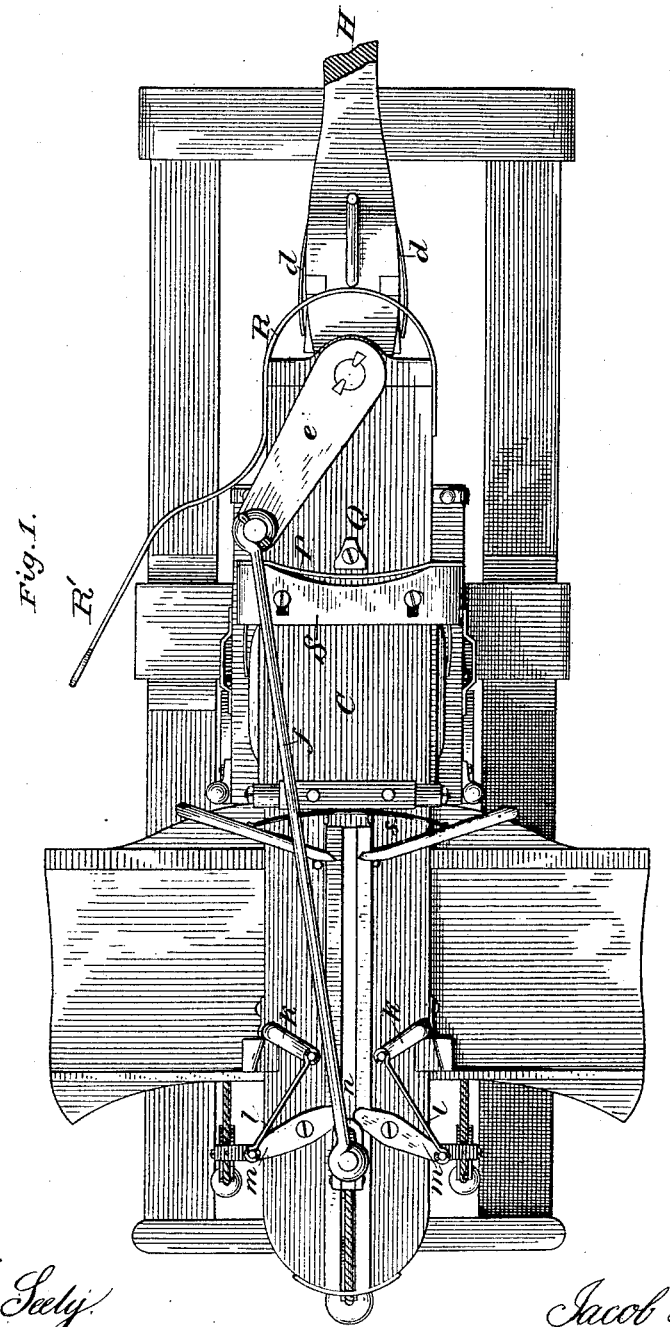
Figure 2:
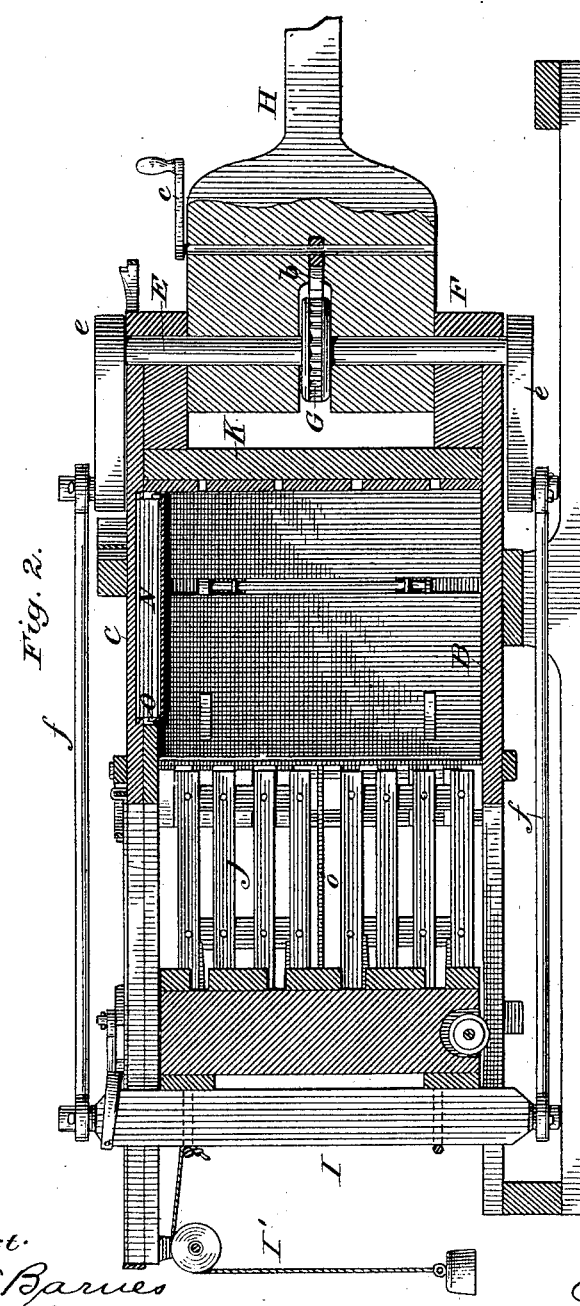
Figure 3:
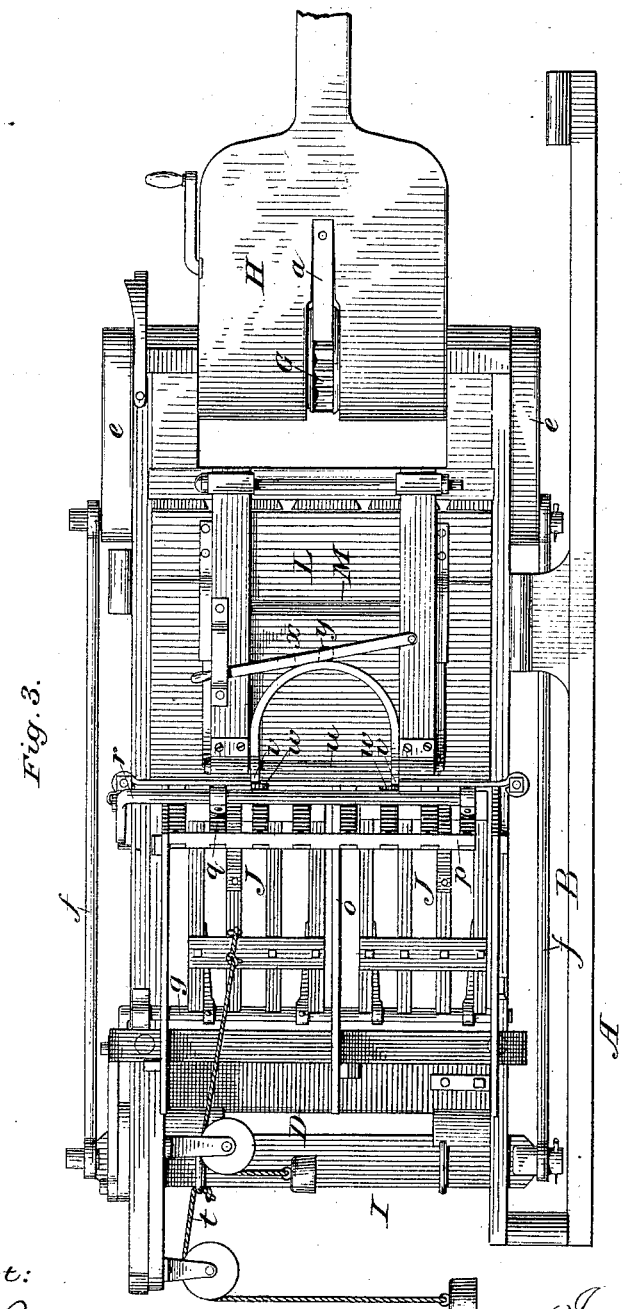
Figure 4:
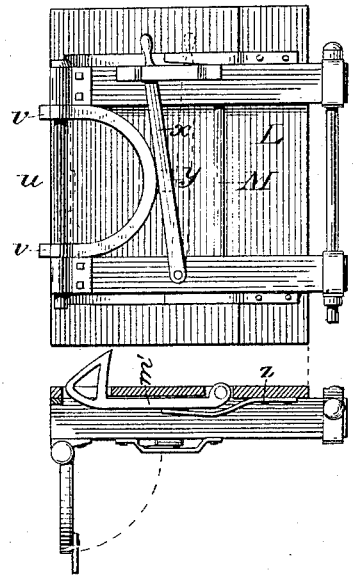
Figure 5:
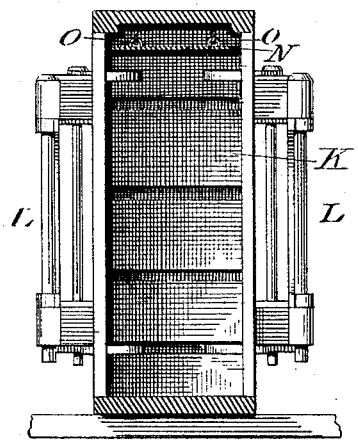

In the drawings, Figure 1 represents a top view, showing particularly the connection with the devices for operating the feeding-doors. Fig. 2 is a central longitudinal section. Fig. 3 is a side view. Fig. 4 is a separate view of the devices for closing and fastening the doors of the baling-chamber. Fig. 5 is a sectional view of the devices for facilitating the removal of the bale.

A represents the supporting-frame for the machine, which is preferably placed upon wheels for convenience in transportation from place to place. B is a bed-plate, extending the entire length of the machine, rigidly attached to cross-bars on the frame; and C is a top plate, D D being standards or supports, all these parts being bolted together to hold the operating parts firmly and securely together.

At the forward end of the machine is a driving-shaft, E, working in bearings in the platforms F F, and upon its central portion is fixed a ratchet-wheel, G, which turns with such shaft. Pivoted upon this shaft is the end of the horse-lever H, suitably slotted to receive the ratchet-wheel, and in this horse-lever are pivoted pawls $a$ $a$ and a forked lever, $b$, operated by a crank, $c$, by the operation of which crank either pawl may be thrown into engagement with the ratchet, and motion thereby imparted to the driving-shaft. Springs $d$ $d$ prevent the pawls from moving outwardly.

At the upper and lower end of the driving-shaft are keyed cranks $e$ $e$, and to these cranks are attached, in the usual manner, the pitman-rods $f f$, the rear ends of which are attached to the top and bottom of the follower I. This follower consists of a vertical plate sliding in slots in the top and bed plates of the press, to which is secured the follower proper, which reciprocates between such plates, and is provided at its lower end with an anti-friction wheel working in a groove in the bottom plate.

At the rear end of the machine, on each side, are the feed-doors J, attached to vertical shafts $g$, stepped in the bed-plate and passing through the top plate, such shafts being provided at their upper end with the cranks $k$, which are connected by rods $l$ to cams $m$, pivoted to the top plate. The operation, therefore, of opening and closing the doors moves the cams $m$ on their pivots, bringing them, when the doors are open, in line with the path traversed by a shoe, $n$, pivoted to the follower. It is evident, therefore, that the forward movement of the follower acting on the cams will close the feed-doors automatically.

The feed-openings on each side are divided into two by a horizontal partition, $o$, which is secured to a frame, $p$, and to one of the supporting-standards D of the machine. This separation of the feed-openings into two is for the purpose of allowing charges of hay, &c., to be introduced from opposite sides of the machine at the same time on one side above and on the other side below the partition without interfering with one another.

The feed-doors when closed are retained in position by a catch, $q$, which engages automatically with a projection on the vertical shaft $r$, journaled in bearings on the frame $p$, the upper ends of these shafts—there being one on each side—being turned at right angles and held by the pressure of a spring, $s$, against stops on the top plate, keeping the catch on the door in engagement with the projection on the shaft. When, however, the follower moves forward, the shoe $n$, acting upon the ends of the cranks or shafts $r$, forces them forward against the pressure of the springs, releasing the catch and permitting the doors to be opened for the insertion of a fresh charge.

Cords $t$ $t$ are shown passing over pulleys journaled in hangers provided with weights, for the purpose of automatically opening the doors after each layer of hay has been pressed, although any proper arrangement of springs could be employed for the same purpose. A weighted cord is also represented as attached to the rear end of the follower, passing over a pulley attached to the top plate, by which such follower is automatically retracted at the end of each stroke.

K is the block or head against which the material or layers are pressed, and, like the follower, is provided with slats for convenience in tying and wiring the bale.

The sides of the bale-chamber are formed of two solid heavy doors, L L, the cross-bars of which are hinged to the front portion of the machine, which supports the baling-head. Journaled in bearings on the rear end of these cross-bars is a vertical shaft, $u$, and attached thereto is a bow-shaped fastening, having at its inner end projecting catches $v$ $v$, which engage with the catches $w$ $w$ on the frame $p$. These catches are held in engagement by a lever, $x$, pivoted to the lower cross-bar of the door, and working in a guide in the upper cross-bar, which engages with the catch $y$ on the forward end of the bow-shaped fastening, and holds it in position. When this lever is thrown back the bow-shaped fastening is released, and is forced to swing outward by the elasticity of the pressed bale, thus opening the door.

A shaft, M, is secured in a slot in the doors, and to it are attached levers $m'$, provided with hooks which extend through such doors, and are held inward by springs $z$, and are hooked over the material in the bale-chamber.

In the upper part of the bale-chamber, and occupying the entire width of the same, is a plate, N, suspended by hangers O O from the top plate of the machine, as shown in separate detail sectional view of Fig. 5.

On the forward end of the top plate is pivoted a bow-shaped catch, R, provided with a recess for holding the upper crank on its center, and this catch is provided with a lever, R', by which it is operated.

On the forward portion of the top plate is a block, S, adjustable by means of screws working in slots therein, and having attached to its front portion a spring or cushion, P, against which the end of the crank bears when the follower is on the point of commencing its forward motion, and a stop, Q, is also attached to the top plate, in order to prevent the crank from going farther than is necessary.

The operation of my device is as follows: Supposing the follower to be drawn back as far as possible to the rear of the machine, the doors to the bale-chamber securely closed, the feed-doors open, and the horse-lever standing at right angles to the machine, a charge of hay is inserted through the feed-doors in front of the follower, on one side above and on the other side below the horizontal partition, the pawls are engaged with the ratchet in the horse-lever through the crank, and the horse-lever is moved through an arc of one hundred and eighty degrees, carrying the follower forward, the pivoted shoe $n$ bearing on the cams, and thereby closing the feed-doors. As the follower reaches the end of its stroke the shoe acts upon the crank-arms of the vertical shafts $r$, releasing the catches which hold the feed-doors closed, which are immediately opened by the weights at the same time that the follower itself is retracted by the weight attached to it. The shoe $n$, the rear end of which is pivoted above the level of the cams, the forward end being allowed to drop by gravity, is thus permitted to slide over such cams, which would obstruct it were it rigidly attached to the follower, the horse-lever having in the meantime assumed a position at right angles to the machine, but at opposite sides thereto, and on the other pawl being thrown into engagement with the ratchet the operation is repeated, successive charges being pressed, it being evident that at each forward movement of the follower two charges, instead of one, as heretofore, will be compressed.

It will be noticed that in this machine the follower is pulled forward toward the front. By this means the length of the machine may be reduced about one-half, as will be evident. By this method of operation there is also less strain brought upon the supporting-frame and the various parts, and the machine is thus made more durable.

When a sufficient number of charges to form a bale have been pressed the cranks are caught on their centers by the semicircular catch R and the side doors are opened and the bale wired in the usual manner.

As the expansion of the bale under pressure would ordinarily make its withdrawal a matter of difficulty, I have provided the pivoted metal plate in the top of the bale-chamber, the hangers supporting which, when an attempt is made to move the bale, yield sidewise to the pressure, and the plate is allowed to move upward in contact with the top of the chamber, thus relieving the pressure on the upper side of the bale and allowing it to come out easily.

I am aware that a vertical press has been provided with a stamper for packing the hay previous to being compressed by the follower, and that such stamper is actuated by pitmen connected to a train of gearing; and, also, that a horizontal press has been provided with a screw-shaft operated by gearing, whereby a follower is screwed toward the forward end of the press, and I claim neither of the constructions named.

Having thus described my invention, what I claim is—

1. In a horizontal baling-press, the combination of a follower adapted to be drawn from the rear of the machine to the front, an oscillating driving-shaft provided with cranks connected to the follower by pitman-rods, and a horse-lever connected to the driving-shaft by intermediate mechanism, whereby the shaft is operated, as described.

2. A baling-press having a single baling-chamber and provided with feed-openings on opposite sides, in combination with the partitions o, as described.

3. In a baling-press, the combination, with the reciprocating follower, of the feed-doors hinged on the vertical shaft, the cranks, the connecting-rods, and the cams, as set forth.

4. In combination, the follower, the feed-doors having catches, the vertical shafts provided with crank-arms, and the spring s, substantially as and for the purpose set forth.

5. In combination with the follower I, the pivoted shoe n, substantially as and for the purpose set forth.

6. In a baling-press, the auxiliary frame p, provided with a horizontal partition, o, substantially as and for the purpose set forth.

7. In combination with a baling-press, the plate N, suspended in the upper part of the baling-chamber so as to swing automatically sidewise when the bale is removed, as described.

8. In a baling-press, the combination of the ratchet-wheel G, pawls a a, forked lever b, springs d d, and crank-shaft c, as described.

9. In combination with a crank, the pivoted catch provided with a recess, substantially as and for the purpose set forth.

10. In combination with the crank and spring, a stop, substantially as and for the purpose set forth.

11. A baling-press wherein the power is applied at the forward end, having a follower adapted to be drawn forward, feed-doors placed opposite each other, closed simultaneously by the follower and automatically opened, and a baling-chamber, as set forth.

In testimony whereof I have signed my name to this specification in the presence of two subscribing witnesses.

JACOB PRICE.

Witnesses:
F. A. HILL,
WM. S. DU BOIS.